Figure 3:
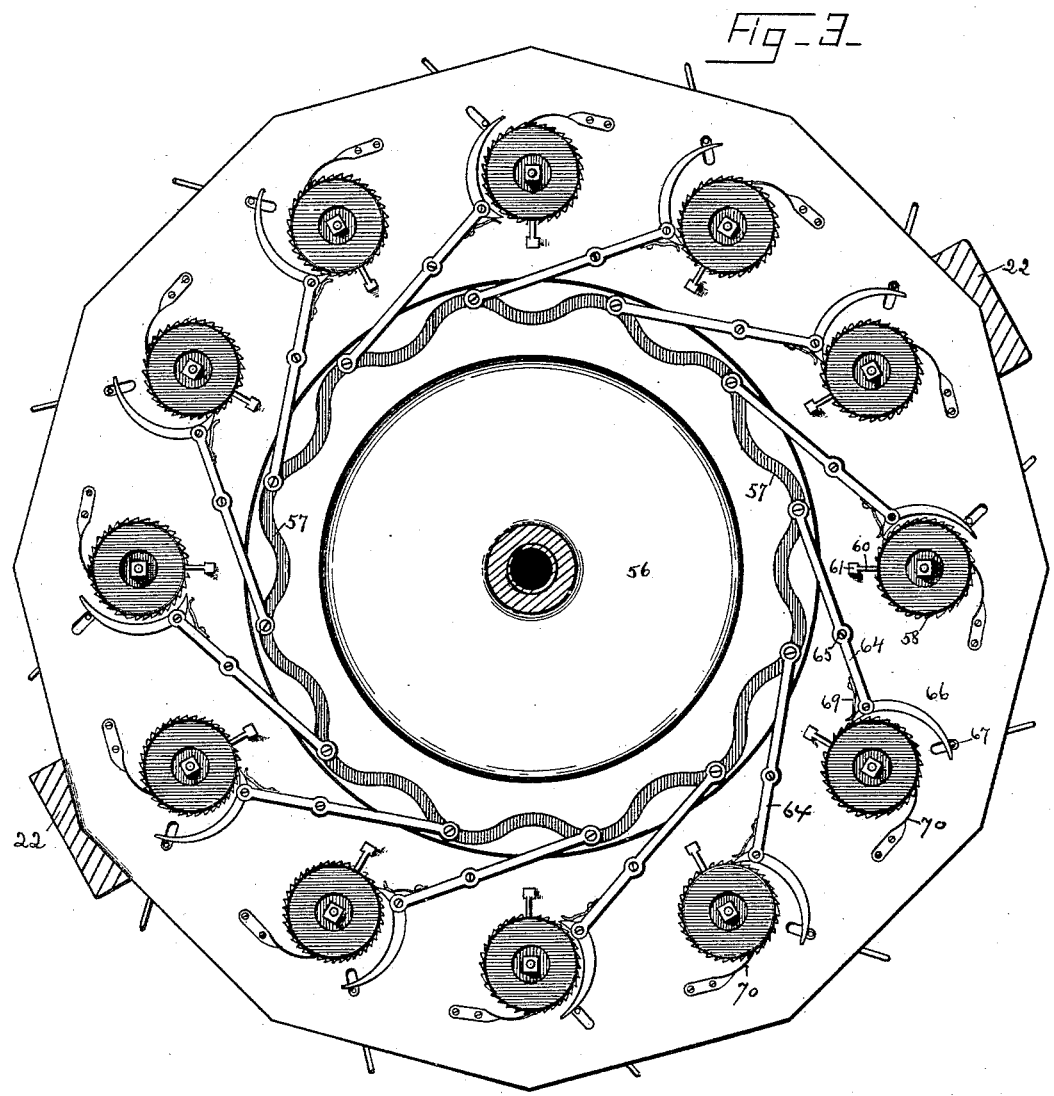

(No Model.) 8 Sheets—Sheet 1.
O. R. VAN VECHTEN.
MACHINE FOR MAKING BRAIDED CORDAGE.
No. 445,256. Patented Jan. 27, 1891.
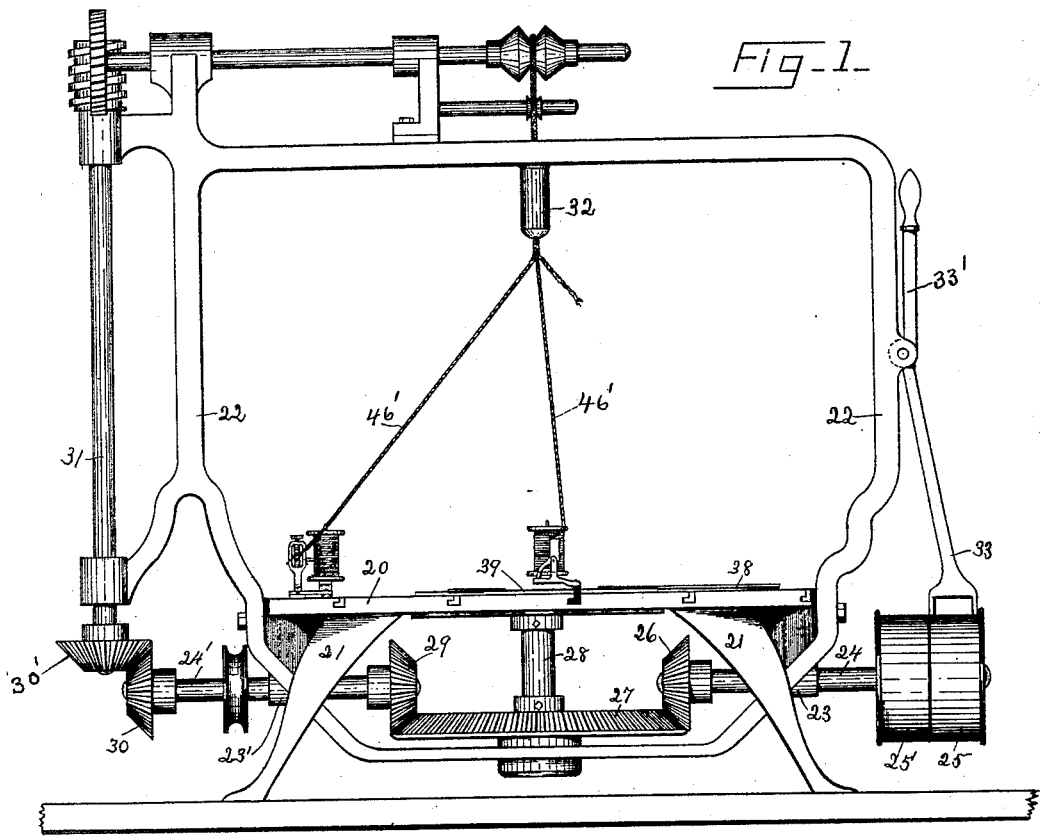
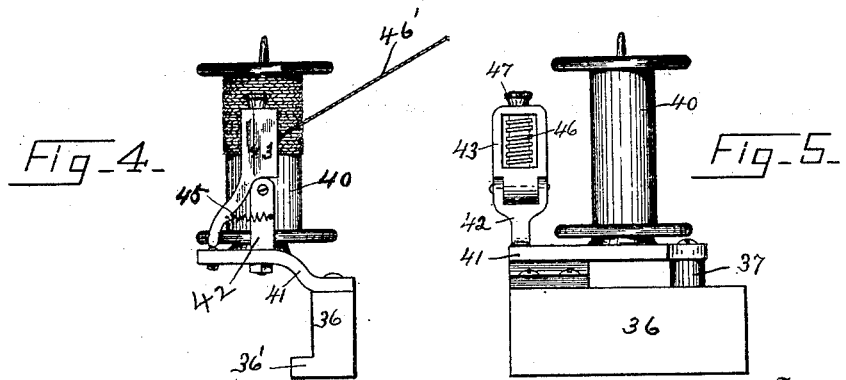
Witnesses
Inventor
Orville R. Van Vechten
By his Attorney
Frank H. Allen

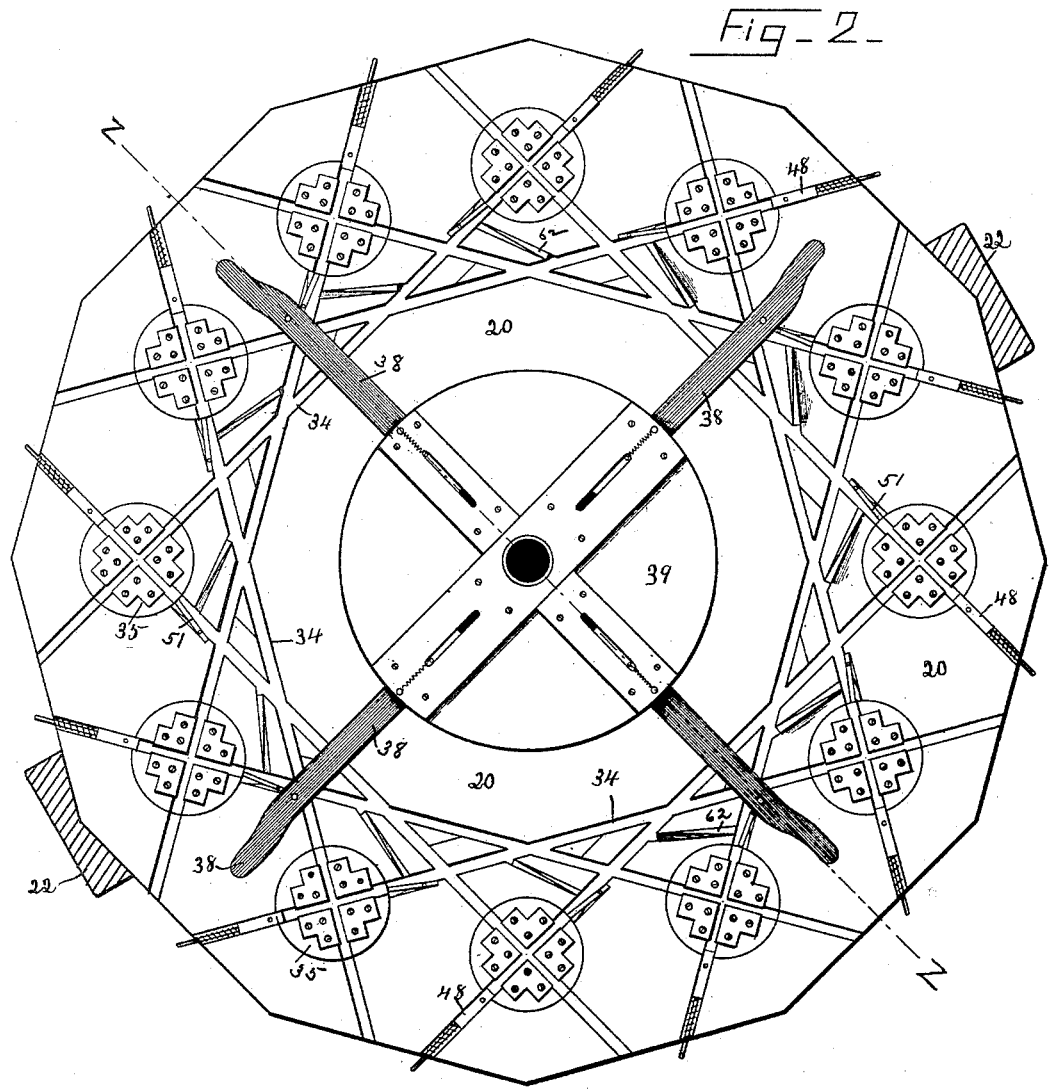

(No Model.)  8 Sheets—Sheet 3.

O. R. VAN VECHTEN.
MACHINE FOR MAKING BRAIDED CORDAGE.

No. 445,256. Patented Jan. 27, 1891.

Witnesses
Alonzo M Luther.
Wm. A. McJennett.

Inventor
Orville R. Van Vechten.
By his Attorney
Frank H. Allen.

(No Model.) 8 Sheets—Sheet 4.

O. R. VAN VECHTEN.
MACHINE FOR MAKING BRAIDED CORDAGE.

No. 445,256. Patented Jan. 27, 1891.

Witnesses
Alonzo M. Luther
Wm. L. McDermott

Inventor
Orville R. Van Vechten
By his Attorney
Frank H. Allen

THE NORRIS PETERS CO., PHOTO-LITHO., WASHINGTON, D. C.

(No Model.) 8 Sheets—Sheet 5.

O. R. VAN VECHTEN.
MACHINE FOR MAKING BRAIDED CORDAGE.

No. 445,256. Patented Jan. 27, 1891.

Witnesses
Alonzo M. Luther
Wm H. McJennett

Inventor
Orville R. Van Vechten
By his Attorney
Frank H. Allen (No Model.) 8 Sheets—Sheet 6.

O. R. VAN VECHTEN.
MACHINE FOR MAKING BRAIDED CORDAGE.

No. 445,256. Patented Jan. 27, 1891.

Witnesses
Alonzo M. Luther
Wm. O. McJennett

Inventor
Orville R. Van Vechten.
By his Attorney
Frank E. Allen.

THE NORRIS PETERS CO., PHOTO-LITHO., WASHINGTON, D. C.

(No Model.) 8 Sheets—Sheet 7.

O. R. VAN VECHTEN.
MACHINE FOR MAKING BRAIDED CORDAGE.

No. 445,256. Patented Jan. 27, 1891.

Witnesses
Alonzo M. Luther
Wm. L. McDermott

Inventor
Orville R. Van Vechten
By his Attorney
Frank H. Allen (No Model.)  8 Sheets—Sheet 8.
O. R. VAN VECHTEN.
MACHINE FOR MAKING BRAIDED CORDAGE.
No. 445,256.  Patented Jan. 27, 1891.
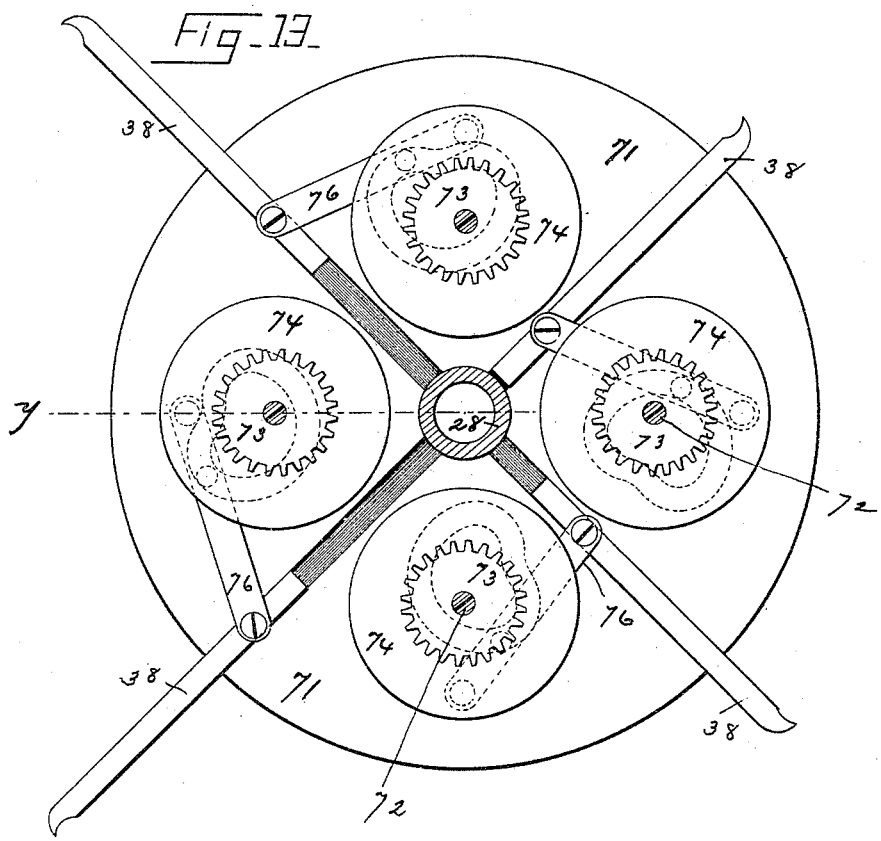
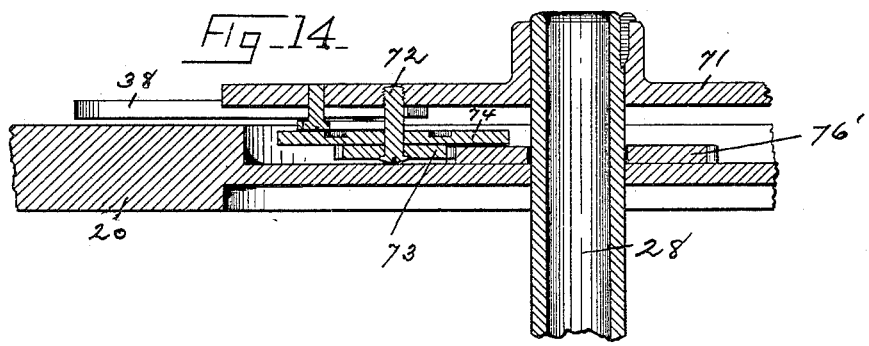
Witnesses  Inventor
Alonzo M. Luther.  Orville R. Van Vechten.
Wm. L. McJennett.  By his Attorney
  Frank H. Allen.
THE NORRIS PETERS CO., PHOTO-LITHO., WASHINGTON, D. C.

UNITED STATES PATENT OFFICE.

ORVILLE R. VAN VECHTEN, OF NORWICH, CONNECTICUT, ASSIGNOR TO JOHN E. WARNER, OF SAME PLACE.

MACHINE FOR MAKING BRAIDED CORDAGE.

SPECIFICATION forming part of Letters Patent No. 445,256, dated January 27, 1891.

Application filed April 11, 1890. Serial No. 347,548. (No model.)

*To all whom it may concern:*

Be it known that I, ORVILLE R. VAN VECHTEN, a citizen of the United States, residing at Norwich, in the county of New London and State of Connecticut, have invented certain new and useful Improvements in Machines for Making Braided Cordage, which improvements are fully set forth and described in the following specification, reference being had to the accompanying eight sheets of drawings.

My said invention is in that class of cordage-machines in which a series of bobbins are carried around a common center and at prescribed intervals are caused to travel around each other to interlace or braid together the multiple of strands carried by said bobbins.

The object of my invention is to provide a cordage-machine that shall be durable and less noisy than many of the machines now in use and by means of which the tension of the threads as they are successively laid up and interlaced may be easily controlled, as hereinafter explained.

In order to more readily explain the said invention, I have provided the annexed set of drawings, illustrating the same both as a whole and in detail, in which—

Figure 6:
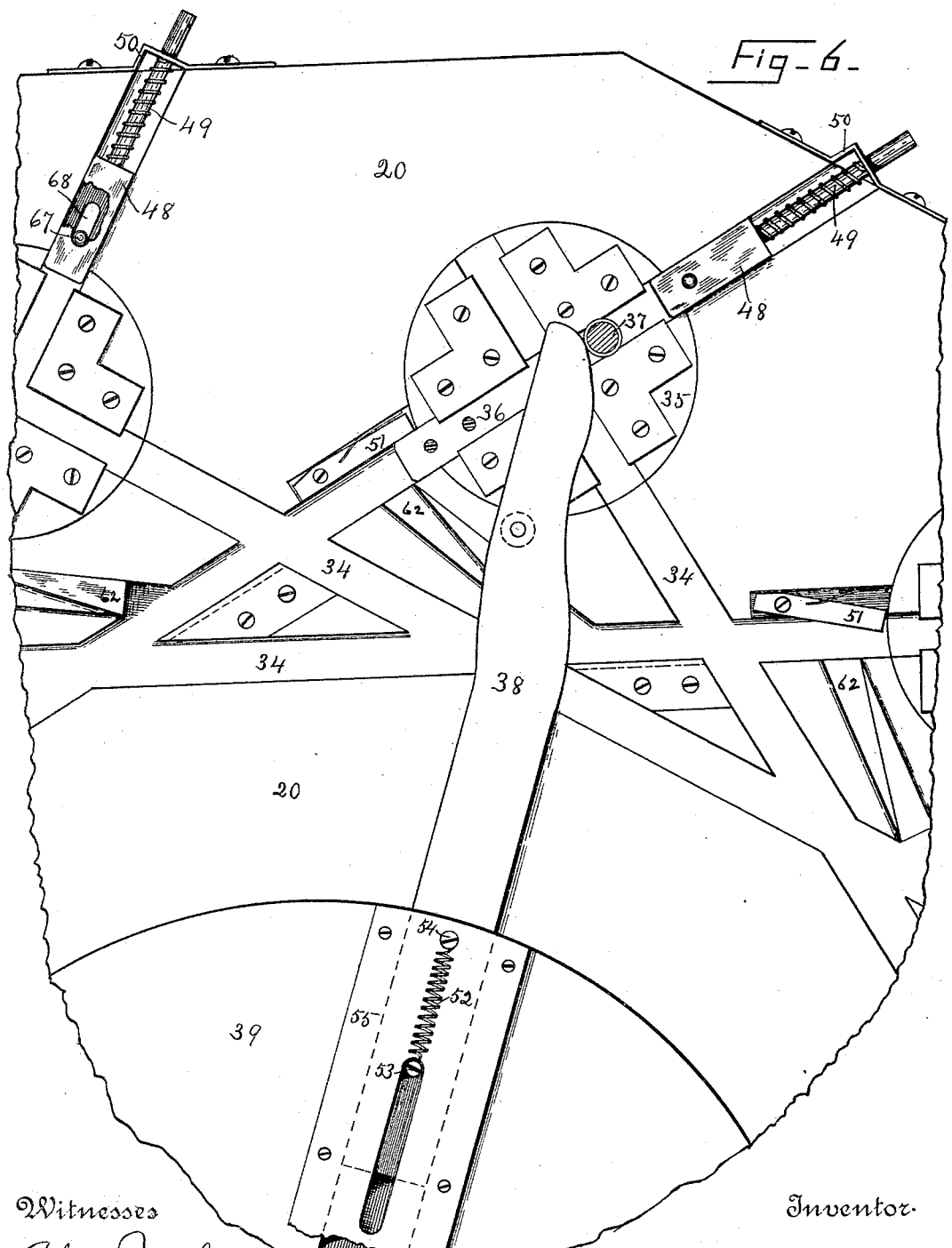
Figure 7:
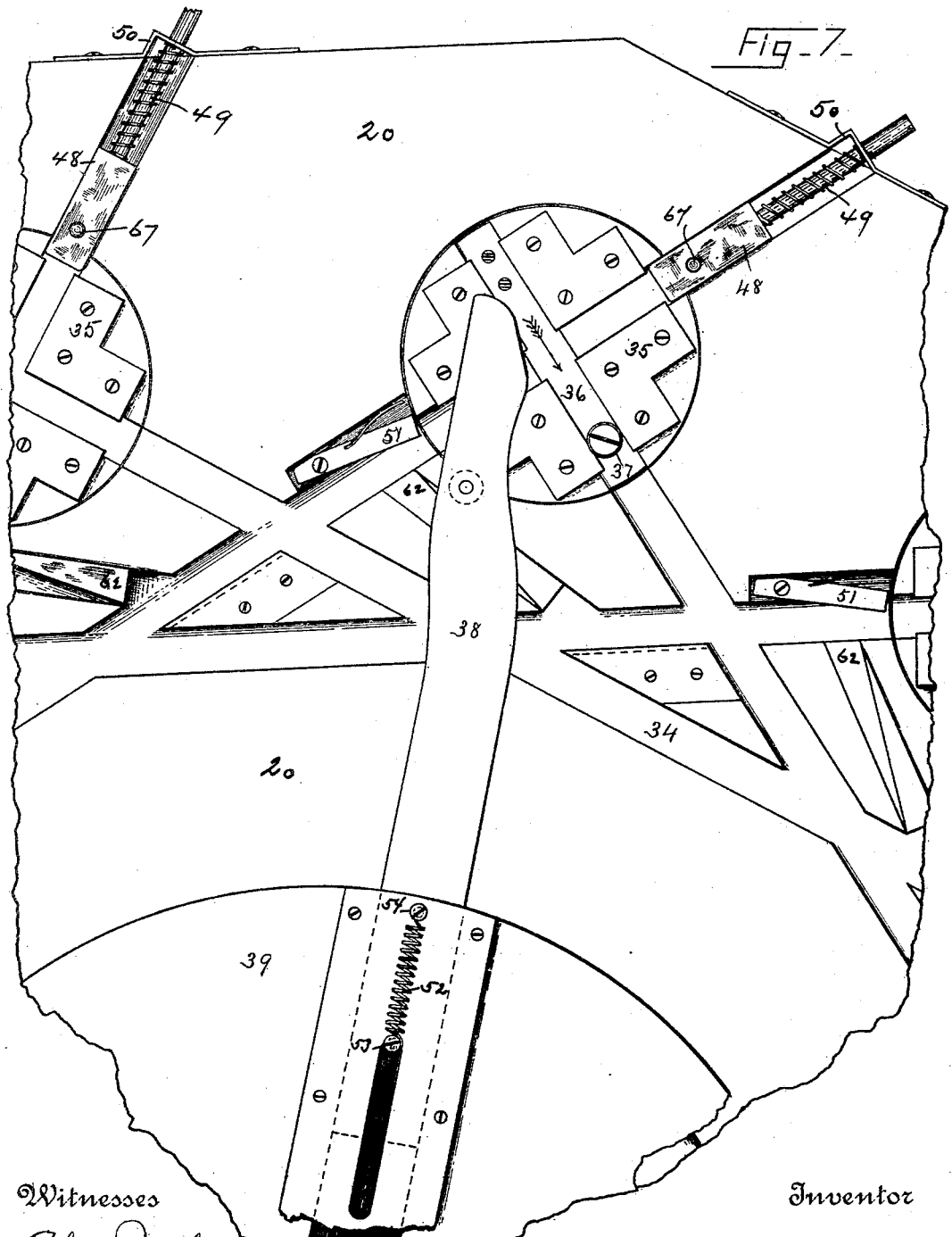
Figure 8:
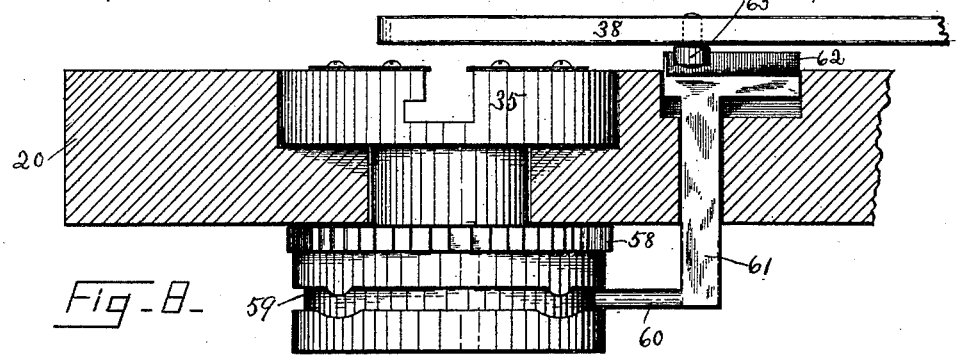
Figure 10:
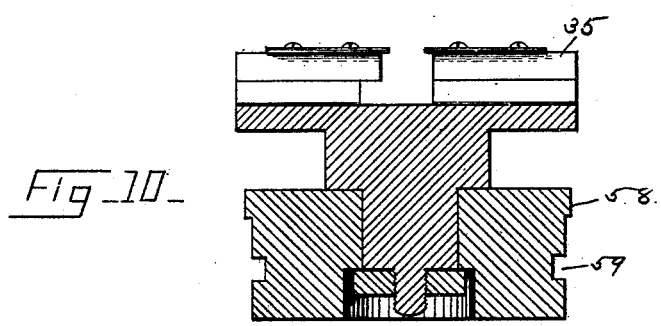
Figure 9:
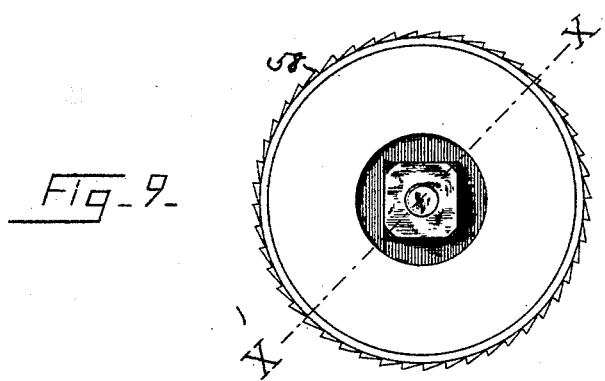
Figure 11:
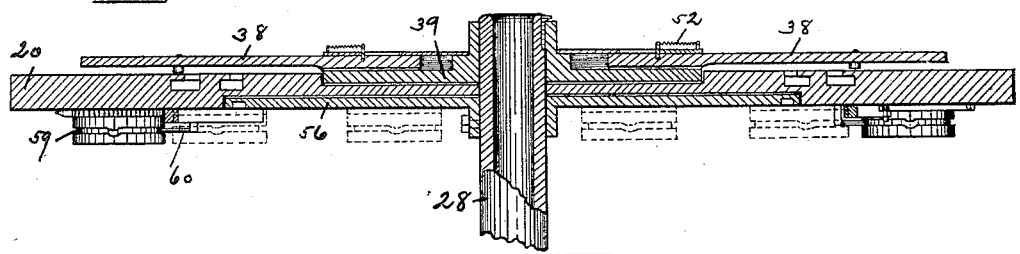
Figure 12:
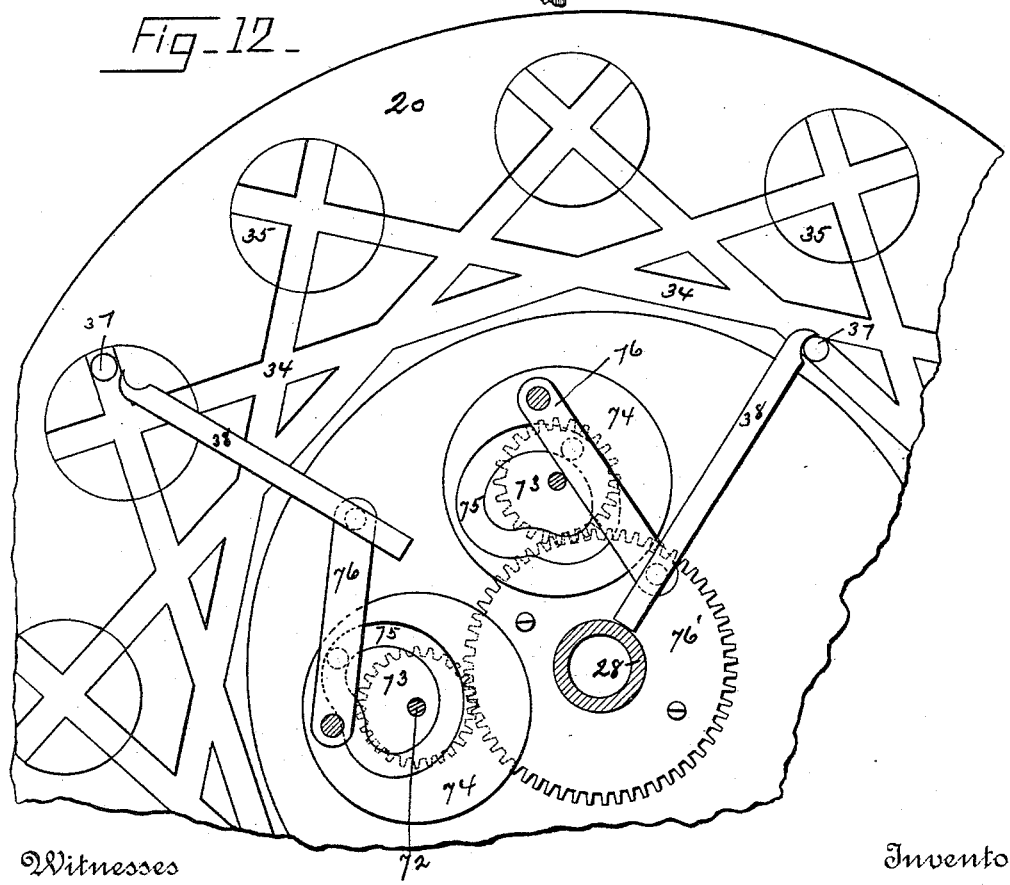

Figure 1 is a side elevation of a machine of my new construction having two of the bobbins and their carriers in place on the bed of the machine, also showing the manner in which the several threads are brought together at the top of the machine and delivered to a suitable take-up. Fig. 2 is a top view, somewhat enlarged, of the bed of a machine of my simplest form; and Fig. 3 is a plan of the reverse or under side of said bed. Figs. 4 and 5 show end and side views, respectively, of the bobbin-carrier which I use, each having a bobbin seated thereon. In Figs. 6 and 7 are shown sections of the machine-bed on an enlarged scale, intended to explain, in connection with the specification, different positions assumed by the bobbin-carriers and the arms that serve to move said carriers at stated times from place to place on the said bed. Fig. 8 is an elevation or side view of one of the switches, or perhaps more properly turn-tables, by means of which the bobbin-carriers are deflected in their courses, and shows the manner in which said turn-tables are rotatably supported in the machine-bed. This said view also shows a portion of one of the arms by which the said carriers are moved and a cam-switch used to operate with said arm under certain conditions to prevent it from engaging with and moving said carriers. Fig. 9 is a bottom end view of the turn-table shown in Fig. 8; and Fig. 10, a central vertical sectional view of the same, taken on line $x\,x$ of Fig. 9. Fig. 11 is a central vertical section of the machine-bed on line $z\,z$ of Fig. 2. Figs. 12, 13, and 14 illustrate a certain modification of my invention, by means of which the radial arms which move the bobbin-carriers are moved outward or inward positively at the proper time instead of depending on the cam-switches shown in Fig. 8. Said Fig. 12 is a plan view of a portion of the machine-bed, showing a fixed gear at the center of the said bed, around which travel a series of smaller gears having attached thereto a corresponding series of cam-disks, the said small gears and cam-disks being arranged to rotate on studs that are secured to the under side of a large disk, which is removed in Fig. 12, but is shown inverted in Fig. 13. This disk is grooved radially to receive and guide the series of arms that move the bobbin-carriers and is secured to and rotates with an upright driving-shaft in the center of the machine, as shown in Fig. 14, which latter is a vertical sectional view on line $y\,y$ of said Fig. 13.

Referring to the said drawings, 20 denotes the bed of my machine, the same being supported by legs 21 and provided with uprights 22 on opposite sides of said bed. Depending from bed 20 on opposite sides are bearings 23 23′, in which are journaled horizontal shafts 24 24′, the former of which constitutes the driving-shaft of the machine and bears on its outer end fast and loose pulleys 25 25′. On the inner end of shaft 24 is a bevel-gear 26, that meshes with a larger bevel-gear 27, secured to a hollow vertical shaft 28, that extends upward through bed 20 and is supported at its lower end in a journal-bearing that may be held in position by the frame 22, suspended beneath the machine, as here shown, or may be secured to the floor. Shaft 24' bears on its inner end a bevel-gear 29, that meshes with the larger gear 27, already described, and has on its outer end a miter-gear 30, that is in mesh with a companion gear 30', secured to vertical shaft 31, said vertical shaft being provided to transmit power and motion to any suitable take-up mechanism.

32 denotes a tubular guide located immediately over the center of bed 20, and through this guide the finished cord passes to the take-up.

A shipper 33 and operating-lever 33', by means of which the belt may be thrown from the fast to the loose pulley, and vice versa, are shown at the right hand of the machine in Fig. 1.

The cordage-machine here illustrated is intended to be used in the manufacture of cord of twelve strands. The bed of the machine may be briefly described as a stationary disk having twelve turn-tables seated therein and provided with channels or grooves that describe three intersecting squares, whose corners are at the centers of said turn-tables. For convenience in planing out said channels they, in fact, extend to the outer edge of the bed; but in the manufacture of cord the bobbin-carriers travel in said channels only to the perimeter of the turn-tables. Said channels are indicated by 34, and their general arrangement relative to each other and to the turn-tables (denoted by 35) is best seen in Fig. 2 of the drawings. That side of each of channels 34 that is farthest from the common center of the machine is undercut, as clearly shown in Figs. 1 and 11, and the corresponding channels in the turn-tables are similarly undercut, as shown in Figs. 8 and 10.

My bobbin-carrier consists of a bar 36, adapted to fit and slide in the channels 34 and having a longitudinal rib 36', that enters the described under-cut in the bed and turn-tables. Bar 36 has secured to its upper edge an anti-friction roller 37, that is engaged when the machine is in use by one of four arms 38, that project radially from a disk 39, secured to and carried by the upper end of the hollow vertical shaft 28 at the center of the bed 20. These radial arms travel around with a regular steady movement and at stated times engage the rollers 37 and move the attached bobbin-carrier forward through channels 34 to the turn-table at the other end or angle of said channels. The bobbin 40 is seated on a plate 41, secured to bar 36, and projecting upward from the same plate is a forked arm 42, to which is hinged a lever 43, whose lower arm extends downward and is connected with arm 42 by a spiral spring 45, that tends to draw said lower arm toward the said forked arm 42. The upper arm of the lever 43 is formed with an opening, (see Fig. 5,) in which is a coarsely-threaded rod 46, having secured to its upper end a milled head 47, by means of which said threaded rod may be rotated. When the thread 46' is delivered from bobbin 40, it is passed one or more turns around the rod 46 to give the desired tension, and then passes upward to the tube 32, where it meets and is interlaced with the several threads from the other bobbins of the series.

The turn-tables 35 are locked when not in the act of rotation by a sliding bolt 48, that is seated in one of the channels 34 outside of the square in which the carriers slide, said bolt being pressed normally toward the turn-table by a spiral spring 49, whose outer end abuts against a plate 50, secured to bed 20. When a bobbin-carrier is moved forward into the turn-table by arm 38, the end of its bar 36 abuts against the end of bolt 48 and moves and holds it out of locking engagement with the turn-table until said turn-table is rotated a quarter of the way around, when said bolt shoots forward into the next channel and again serves as a lock to prevent the undue rotation of the turn-table. This is perhaps best illustrated in Figs. 6 and 7. In Fig. 6 the bar 36 of the carrier is shown as if advancing across the turn-table and just about to engage and push back the bolt 48, while in Fig. 7 the turn-table has been rotated a quarter-turn and the bolt has entered the next channel. In these figures the bar 36 is shown with plate 41 removed. When said bar is pushed forward into the turn-table by arm 38, it (the bar) is kept from moving backward in the main channel by a spring-actuated pawl or stop 51, that drops in the rear of said bar as it passes. If this pawl or some equivalent stop was not provided, the bolt 48 would force bar 36 rearward in its channel the instant arm 38 left the anti-friction roller 37, and would thus lock the turn-table against rotation. Arms 38, as illustrated in Figs. 2, 6, 7, and 11, are held normally outward by springs 52, one end of said springs being attached to a stud or screw 53 in said arm, the other end being secured by screw 54 to the disk 39 or to a plate 55 carried by said disk. A slot in said plate 55, through which screw 53 projects, allows a limited endwise movement of the arms, as will be understood by reference to Figs. 6 and 7. It will now be apparent that means must be provided to partially rotate the turn-tables 35 at stated times to permit arms 38 to reach the roller 37 and move the bobbin-carrier forward in its proper channel. This is done by positive mechanism on the under side of bed 20, as best seen in Fig. 3, the necessary power and motion being communicated by a disk 56, that is secured to and travels with the central shaft 28 and is formed with a sinuous or serpentine cam-groove 57 near its perimeter. The turn-tables 35 are shouldered down to fit in the counterbored bed 20, (see Fig. 8,) and secured to their lower ends are both ratchet and cam disks 58 and 59, respectively, the latter being provided with four breaks or deflections in its annular groove. This cam-groove receives the end of an arm 60, projecting laterally from a bar 61, which is seated in bed 20 and free to be raised or lowered by cam 59 to bring at the proper time a cam-switch 62 into the path of a roller 63, carried by arm 38, as is best illustrated in Fig. 8. These cam-switches 62 are also seen in Figs. 2, 6, and 7. When it is desired to leave a bobbin-carrier in the turn-table, as is necessary at stated times in braiding, one of said switches 62 is raised by cam-groove 59, and as arm 38 advances its roller 63 engages said switch and the arm is moved inward against the force of spring 52, and its end is thus carried past the roller 37 on the bobbin-carrier, leaving said bobbin-carrier in the turn-table.

Referring now to Fig. 3, 64 denotes a lever-arm secured to the under side of bed 20 by pivot-screw 65 and having at its inner end an anti-frictional roller that enters the serpentine cam-groove 57, already described. The opposite end of lever 64 has pivoted thereto a lever 66, whose shorter arm forms a pawl to engage the teeth of ratchet-disk 58. The longer arm of lever 66 curves around the said ratchet-disk and engages a stud 67, that is attached to the bolt 48 and projects downward through a slot 68 in bed 20. (See also left-hand side of Fig. 6, which shows said bolt partly cut away to expose slot 68 in the bed beneath.) A spring 69, secured to arm 64, bears on the short or pawl end of lever 66 and tends to hold said pawl in engagement with the ratchet-teeth. A detent 70, secured to bed 20, is provided to prevent backward rotation of the ratchet-disk and connected turn-table. When the machine is in motion, levers 64 are being constantly rocked on their fulcra by the serpentine cam-groove 57 and the described pawls engage one tooth of the ratchet-disks 58 at each complete movement of said levers, thus slowly rotating the turn-tables until a quarter-turn has been completed, when the forward movement of bolt 48 causes its attached stud 67 to force the longer arm of lever 66 inward. This throws the shorter or pawl end out of operative engagement with the ratchet-teeth, and for a time said pawl moves forward and backward idly. When, however, a bobbin-carrier is moved into the turn-table and bolt 48 pushed outward by it, the pawl is again allowed to engage the ratchet-teeth and immediately begins to rotate said turn-table another quarter of a revolution. It will thus be seen that the entering of the bobbin-carrier in a turn-table acts to throw out the bolt 48, and that such movement of the bolt allows the pawl to engage the teeth of the ratchet, and that the constantly-oscillating pawl serves to rotate or partially rotate the turn-table to allow the bobbin-carrier to depart by the proper channel 34. The cam-switches 51 also provide automatic means for controlling the arms 38 to cause said arms to take the bobbin-carriers from the turn-tables or leave them there, as may be necessary, and it will be obvious that if the several described mechanisms are properly timed relative to each other certain bobbin-carriers and their threads may be carried beneath or between other threads at proper times to interlace or braid together said threads into a single perfect cord.

In Figs. 12, 13, and 14 the general construction of the machine is as above described; but instead of employing the cam-switches 62 to force inward arms 38 I provide a system of cams, gears, and levers that operate together to draw said arms inward positively. In this last-named construction I provide a disk 71 in place of the described disk 39 and slot the same on its under side to receive the arms 38. I also secure to said disk 71 by studs or screws 72 a series of small gears 73, that carry with them as they rotate disks 74, having cam-grooves 75.

76 indicates lever-arms having one end connected to arms 38 and the opposite end connected to the under side of disk 71, while a roll on the side of said lever-arms enters the cam-grooves 75.

A gear 76' is secured non-rotatably on bed 20 beneath disk 71 and is of such size that when the several parts are assembled it meshes with the series of smaller gears 73, which latter as they are carried around by and with disk 71 are caused to rotate. This rotates the attached cam-disks 74, and through the lever-arms 76 the radial arms 38 are moved outward or inward, according to the shape of the cams. The central shaft 28 is made tubular, so that a solid core may, if desired, be introduced into the cord.

The described turn-tables, in addition to turning the bobbin-carriers, as explained above, also serve a valuable purpose in putting the desired tension into the cord as it is braided. When the bobbin-carrier is moved forward into the turn-table by arm 38, the thread is left with but little tension; but so soon as the pawl 66 begins to rotate said turn-table that end of bar 36 over which the tension-screw 46 is located is gradually carried away from the common center of the machine, and as a consequence the thread is gradually strained taut, the peculiar construction (pawl-and-ratchet mechanism) providing great power and working independently of the various other parts of the machine.

By providing machines having suitable numbers of turn-tables cord of any number of ends or threads may be produced, and by varying the time and movement of the different bobbin-carriers cable-laid and other forms of cord may be made. Many of the machines now in use for making braided cord have but a limited range of work. In other words, cord of different sizes cannot be readily made on such machines; but with my described machine all of the commercial sizes of such cord can be produced on a single machine by simply supplying thread or yarn of suitable size and properly regulating the tension.

Having thus described my invention, I claim as new and wish to secure by Letters Patent—

1. In a machine for making braided cordage, in combination with a stationary bed having a series of channels forming intersecting squares, as set forth, a series of channeled turn-tables located at the angles of said squares, and mechanism, substantially as described, for partially rotating said turn-tables at intervals, for the purpose specified.

2. In combination with a stationary bed, having seated therein a series of turn-tables, both bed and turn-tables being channeled, as set forth, mechanism, as described, for partially rotating said turn-tables at intervals, and spring-actuated bolts that enter said turn-tables at each quarter-revolution, all substantially as specified.

3. In combination with a bed and a series of turn-tables seated therein, both bed and turn-tables being channeled, as set forth, mechanism, as described, for partially rotating said turn-tables at intervals, spring-actuated bolts that may enter said turn-tables at each quarter-revolution, and a series of arms radiating from and carried by a horizontal disk secured to a vertical shaft at the center of the complete machine, all substantially as and for the objects specified.

4. In combination with a channeled bed and a series of correspondingly-channeled turn-tables seated in said bed, as set forth, pawl-and-ratchet mechanism, as described, for partially rotating said turn-tables at intervals, spring-actuated bolts that enter said turn-tables at each quarter-revolution, and a series of pawls 51, located at the entrance to said turn-tables in the paths of the bobbin-carriers, substantially as and for the purpose specified.

5. In combination with a channeled bed and a series of correspondingly-channeled turn-tables seated in said bed, as set forth, pawl-and-ratchet mechanisms for partially rotating said turn-tables at intervals, and a series of arms 38, radiating from a rotatable disk at the center of said bed, said arms being capable of endwise movement in said disk and being forced normally outward by springs 52, substantially as specified.

6. In combination with a channeled bed and a series of correspondingly-channeled turn-tables seated therein, as set forth, mechanism, as described, for rotating said turn-tables, spring-pressed bolts that enter said turn-tables at each quarter-revolution, a series of arms radiating from a rotatable disk carried by a shaft at the center of the said bed, said arms being provided with rollers 63 on their under sides, a series of cam-switches 62, vertically movable in said bed, and mechanism, substantially as described, for raising said switches into the path of rollers 63 at stated times, for the purpose specified.

7. In combination with a channeled bed and a series of correspondingly-channeled turn-tables seated therein, as set forth, a central vertical shaft, a disk 39, secured to the upper end of said shaft and carrying a series of radial arms 38, a disk 56, secured to said central shaft beneath the said channeled bed and provided near its perimeter with a serpentine cam-groove, as set forth, pawl-and-ratchet mechanisms, substantially as described, for partially rotating said turn-tables, and lever-connections between said serpentine cam-groove and pawls, all for the objects specified.

8. In combination with a channeled bed and a series of correspondingly-channeled turn-tables seated therein, spring-pressed bolts that enter the turn-table channels at each quarter-rotation, as set forth, each of said bolts being provided with a stud 67, that projects through a slot in the machine-bed, an oscillating pawl having one end adapted to engage ratchet-teeth on one of the said turn-tables and the opposite end projecting into the path of one of said studs 67 in such manner that when said spring-pressed bolt is in locking engagement with the turn-table the said pawl end is out of operative engagement with the said ratchet-teeth, and mechanism, as set forth, for operating said pawls, all being substantially as and for the objects specified.

9. A stationary bed channeled to form intersecting squares, a series of correspondingly-channeled turn-tables located at the angles of said squares, and mechanism, as described, for rotating said turn-tables, in combination with a series of radial arms carried by a disk concentric with said bed and a series of bobbin-carriers fitted to slide in said bed and turn-tables, as and for the purpose specified.

10. In combination with a channeled bed and a series of correspondingly-channeled turn-tables seated therein, as set forth, mechanism, substantially as described, for rotating said turn-tables, a central vertical shaft carrying at its upper end a disk 39, with longitudinally-movable radial arms 38, and at its lower end a bevel-gear 27, and a horizontal driving-shaft bearing a bevel-gear 26, that meshes with the said gear 27, and fast and loose pulleys, substantially as and for the objects specified.

ORVILLE R. VAN VECHTEN.

Witnesses:
 FRANK H. ALLEN,
 ALONZO M. LUTHER.